US008922563B2

(12) United States Patent
Lloyd

(10) Patent No.: US 8,922,563 B2
(45) Date of Patent: Dec. 30, 2014

(54) DIGITAL NUMERIC DISPLAY WITH ADAPTIVE CHARACTER WIDTH

(75) Inventor: Robert F. Lloyd, Muskego, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 2316 days.

(21) Appl. No.: 11/529,994

(22) Filed: Sep. 29, 2006

(65) Prior Publication Data

US 2008/0082913 A1  Apr. 3, 2008

(51) Int. Cl.
*G06T 11/00* (2006.01)
*G09G 5/26* (2006.01)

(52) U.S. Cl.
CPC .................................. *G09G 5/26* (2013.01)
USPC ........................... 345/467; 345/660; 345/661

(58) Field of Classification Search
USPC ...................................... 345/467, 660, 661
See application file for complete search history.

(56) References Cited

U.S. PATENT DOCUMENTS

| | | | | |
|---|---|---|---|---|
| 5,563,626 | A * | 10/1996 | Speed | 345/472 |
| 5,859,648 | A | 1/1999 | Moore et al. | |
| 6,150,996 | A * | 11/2000 | Nicholson et al. | 345/1.3 |
| 6,414,698 | B1 | 7/2002 | Lovell et al. | |
| 6,603,493 | B1 | 8/2003 | Lovell et al. | |
| 6,922,155 | B1 * | 7/2005 | Evans et al. | 340/825.28 |
| 2001/0055020 | A1 * | 12/2001 | Hertzfeld | 345/472 |
| 2003/0085898 | A1 * | 5/2003 | Yahyapour | 345/467 |
| 2004/0165015 | A1 * | 8/2004 | Blum et al. | 345/962 |
| 2004/0183817 | A1 * | 9/2004 | Kaasila | 345/660 |
| 2007/0046560 | A1 * | 3/2007 | Neugebauer et al. | 345/1.1 |

* cited by examiner

*Primary Examiner* — Maurice L McDowell, Jr.
(74) *Attorney, Agent, or Firm* — Fletcher Yoder, P.C.

(57) ABSTRACT

A technique is disclosed for dynamically adjusting dimensions of characters, such as digits, displayed on a configurable display, such as in a human-machine interface. The height of the characters is fixed and the width is altered depending upon the number of characters to be displayed, resulting in changing aspect ratios for the characters. The width may be set to a predetermined maximum character width if all characters to be displayed will fit within the available space, or the width may be reduced to accommodate more characters. The technique may take into account cushion spaces for borders or frames, as well as spaces between characters. The resulting display allows for a change in the number of significant digits in a displayed numeral, while maintaining excellent readability.

8 Claims, 3 Drawing Sheets

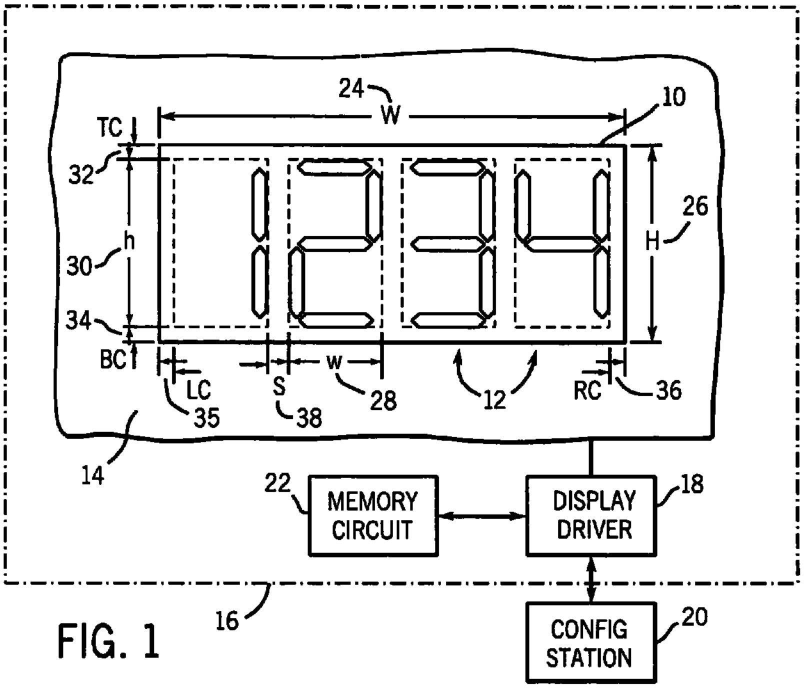
FIG. 1
FIG. 2
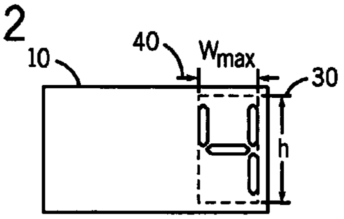
FIG. 3
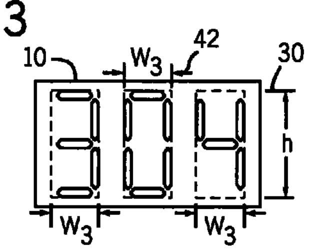
FIG. 4
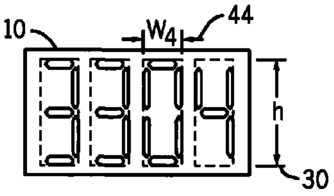
FIG. 5
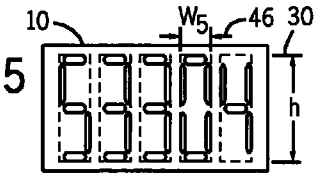

200

DIGITAL NUMERIC DISPLAY WITH ADAPTIVE CHARACTER WIDTH

BACKGROUND

The invention relates generally to character displays, such as those used to display numeric values in various human machine interface (HMI) devices. More specifically, this invention relates to a method for optimally arranging characters outside of expected character size limitations commonly encountered by such displays.

In most HMI devices, or any system that presents information or data to an operator using such devices, a screen for displaying such information or data is provided as a part of the device. The screen usually has a fixed width and height, and may consist of several display areas, each displaying different character data or numeric values. In order to display information to an operator, the display areas are updated with new data or values, providing necessary operation information that reflects changing parameters or information.

In addition to the necessary character data or numeric values displayed during operation of the device, the screen must display all other relevant information to the operator, and additionally may provide for control of the HMI device or remote equipment. Because the area of the screen is limited by the fixed width and height, the display areas (e.g., for each digit or character to be displayed) must fit into specifically allocated areas in order to best utilize the available screen area, yet must be large enough to be legible to the operator and display all expected character data or values.

Each individual display area must be of sufficient area to provide optimal legibility to the operator, constraining the minimum size of the display. The display areas are commonly configured to display the largest expected data or value (e.g., number of digits or characters), even if this data or value rarely occurs. The restrictions of available screen area, legibility requirements, and provisions for largest expected data or values all serve to constrain the dimensions of the display areas.

Problems may occur with the display areas if the data or value to be displayed exceeds the allocated space of the display area. Commonly, such values will either overrun the display area or truncate and appear as incomplete or corrupted values. Neither action provides optimal handling of the excessively large values. If the excessively large value overruns the allocated space of the display area, adjacent display areas or view elements will be resized and/or corrupted. Truncated or clipped values often include a clipping character, such as an asterisk, to alert the operator that the value has exceeded the display. However, the operator is still unable to obtain the value. There is a need, therefore, for a technique for that adjusts displays of characters or numeric values to allow complete display of all data or values within an appropriate allocated display area.

BRIEF DESCRIPTION

A method is provided for dynamically displaying numeric values, the method including: accessing settings for a width and a height of a dynamically configurable display area, receiving a plurality of characters for display in the display area, and setting the width of the characters based upon the number of characters received and the width of the dynamically configurable display area.

A method is also provided for displaying numeric values. In an exemplary implementation, this method includes accessing settings for a width and a height of a dynamically configurable display area, receiving a first number of characters for display in the dynamically configurable display area, dynamically determining a first width for each of the first number of characters based upon the width of the dynamically configurable display area and first number of characters, and displaying the first number of characters with the first width. Subsequently, a second number of characters is received for display in the dynamically configurable display area, a second width is dynamically determined for each of the second number of characters based upon the width of the dynamically configurable display area and second number of characters, and the second number of characters is displayed with the second width.

There is also provided a method for displaying numeric values that includes setting a width and a height of a dynamically configurable display area, and dynamically setting an aspect ratio for at least one character to be displayed based upon preset width and height values for the dynamically configurable display area.

DRAWINGS

These and other features, aspects, and advantages of the present invention will become better understood when the following detailed description is read with reference to the accompanying drawings in which like characters represent like parts throughout the drawings, wherein:

FIG. 1 illustrates an HMI device with a dynamic display area and the corresponding parameters of the characters and display areas to be set by an exemplary embodiment of the present technique;

FIG. 2 shows one character displayed in an exemplary dynamic display area according to the method of the present invention;

FIG. 3 shows three characters displayed in the dynamic display area of FIG. 2 according to the method of the present invention;

FIG. 4 shows four characters arranged in the same dynamic display area according to the method of the present invention;

FIG. 5 shows five characters arranged in the same dynamic display area according to the method of the present invention;

DETAILED DESCRIPTION

Figure 6:
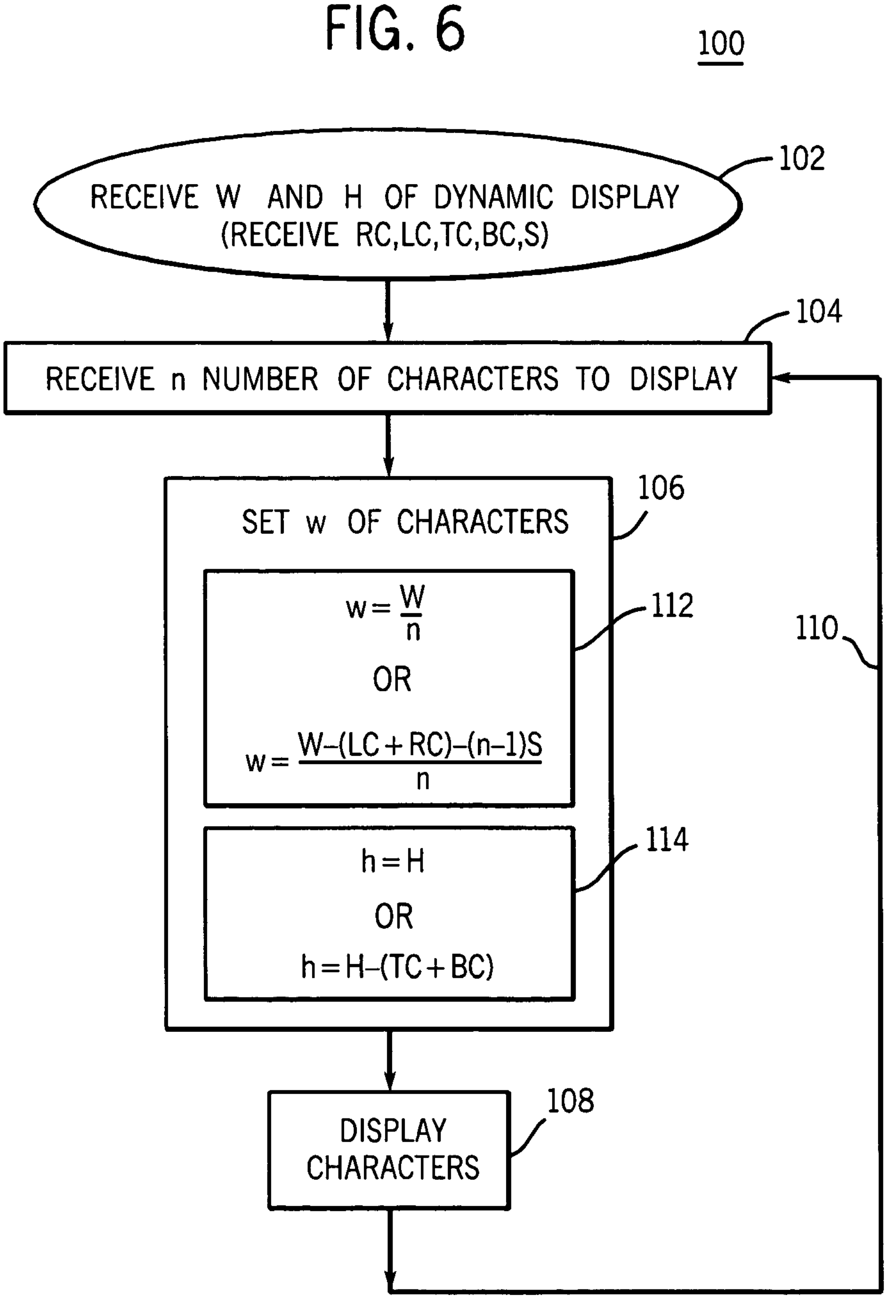
FIG. 6 is flowchart illustrating a process for setting the width of the characters in a display of the type shown in the previous figures according to the invention.

The current invention provides a technique for optimally displaying characters or numeric values in a dynamic display area. The width of the characters to be displayed is set depending on the number of characters and the width of the dynamic display area. Additionally, a preferred maximum width may be used in determining the width of the characters. The width of the characters may also be set as an aspect ratio or based upon such a ratio, typically represented by the ratio of the width to the height. As will be appreciated by those of ordinary skill in the art, setting the width of the characters is interchangeable with setting the aspect ratio of the characters, particularly when the height of the characters is fixed; setting the width or height essentially results in setting the aspect ratio and vice versa, as both width and height dimensions are needed to display the characters.

Referring now to the figures, particularly, FIG. 1, there is shown a dynamic display area 10 for displaying characters 12 in a display 14. The display is part of an HMI device 16, which further includes a display driver 18 which operates the display 14. A configuration station 20 is also shown, which allows an operator to interact with the HMI device 16, such as to program the dimensions of the display area 10, the characters to be displayed, or the program used to compute such characters based upon inputs received by the device. The memory circuit 22 may contain the logic necessary for execution of the current technique, or the logic may be stored in other memory not shown. The display 14 may be a liquid crystal display, a light emitting diode display, or any other type of displays, as the present invention is intended to operate with any type display.

FIG. 1 shows the following parameters of the dynamic display area 10: the width (W) 24 and the height (H) 26 of the dynamic display area. Moreover, each individual character displayed has a width (w) 28 and a height (h) 30. In the illustrated embodiment, the characters are spaced from outer dimensions of the dynamic display area 10 by a top cushion (TC) 32 and a bottom cushion (BC) 34 representing a cushion of space above and below the displayed characters. Similarly, a left cushion (LC) 35 and right cushion (RC) 36 may be provided that correspond to a minimum cushion of space between the furthest left character and the left edge of the dynamic display area, and a minimum cushion of space between the furthest right character and the right edge of the dynamic display area respectively. Alternatively, any or all of the cushion spaces shown may be eliminated. The parameters may also include a space (S) 38, providing a separation between the characters.

Together, the width 28 and the height 30 may be referred to as the aspect ratio of each character. As will be described further, the width 28 of the characters is determined according to the current invention. The width 28 may be determined from the width 24 of the dynamic display area, the total number of characters to be displayed in the dynamic display area and/or a preferred maximum width of the characters. Moreover, as described below, the height 30 of the characters is maintained constant or fixed as the width is changed. It has been found that the resulting display can accommodate different numbers of digits or characters that remain easily readable.

FIG. 2 illustrates the sizing of one character in the display area according to the exemplary embodiment of the current invention. A parameter $w_{max}$ 40, representing the preferred maximum width of a character 12, is set or retrieved (e.g., from memory circuit 22) for use in determining the width 28 of the character 12. In FIG. 2, the size of the character includes the preferred maximum width, as setting the character width to the preferred maximum width does not result in the characters exceeding the width 24 of the dynamic display area 10. In FIG. 2, the width of the character is equal to $w_{max}$ 40. The height 30 of the character is equal to the height 26 of the dynamic display area, excluding any top cushion and bottom cushion. As a result, the aspect ratio of the character is also set. In general, the maximum width of the character is set to a value at which the character is easily readable.

It should be noted that, as described below, while the outer bounds of the dynamic display area are typically set and programmable in the HMI, the actual characters may often only occupy a somewhat smaller area, spaced from the outer bounds by the cushion spaces mentioned above. This allows for the use of graphical features such as boundaries, frames, and so forth around the characters. Similarly, the characters will typically be spaced from one another by some set or variable spacing, as also mentioned above. In the present discussion, then, and as described in more detail below, the height (h) of the characters will typically be set to a constant value somewhat less than the height (H) of the display area. Similarly, when the width (w) of the characters is computed, this will generally be set to a value that allows for the left and right cushions and the spacing between the characters.

It should also be noted that the invention is described with exemplary 7-element numerals displayed. Displays made up of such values are presently contemplated, and many applications exist for such characters. However, the invention is not necessarily limited to any such character or character composition.

Moving on to FIG. 3, three characters are now shown in dynamic display area 10. The three characters 12 each have a corresponding character width ($w_3$) 42, set in accordance with the exemplary embodiment of the current invention (described below). Again, because the use of the preferred maximum width does not result in the combined width of the characters exceeding the width 24 of the dynamic display area 10, the character width 42 is set to the preferred maximum width $w_{max}$. The height 30 of the characters remains the height 26 of the dynamic display area 10 excluding any top cushion and bottom cushion, again resulting in setting the aspect ratio of the characters.

In FIG. 4, four characters are now arranged in dynamic display area 10 and have been resized relative to the characters in FIGS. 2 and 3. Each of the four characters has a corresponding character width ($w_4$) 44, set in accordance with the exemplary embodiment of the invention. In this sizing determination, use of the preferred maximum width $w_{max}$ would result in the characters exceeding the width 24 of the dynamic display area 10. The width 44 of the characters is thus instead set from the width 24 of the dynamic display area 10, including any left cushion and right cushion, and the number of characters to be displayed (as well as the spacing between characters), in this case four characters. The height 30 of the characters remains the height 26 of the dynamic display area accounting for any top cushion and bottom cushion, again resulting in setting an aspect ratio of the characters.

In FIG. 5, five characters are now displayed in dynamic display area 10 and have been resized relative to the characters in FIGS. 2, 3, and 4. Each of the five characters has a corresponding character width ($w_5$) 46, set in accordance with the exemplary embodiment of the invention. In this sizing determination, use of the preferred maximum width $w_{max}$ would again result in the characters exceeding the width 24 of the dynamic display area 10. The width 46 of the characters is thus instead set such that all characters fit within the width 24 of the dynamic display area including any left cushion and right cushion, and spaces between the characters to be displayed. The height 30 of the characters remains the height 26 of the dynamic display area minus any top and bottom cushions, again resulting in setting an aspect ratio of the characters. Further displays of characters will result in sizing with or without use of the preferred maximum width $w_{max}$, according to present technique.

FIG. 6 illustrates a flowchart representing the steps of an exemplary embodiment of the present invention. The process 100 for setting the width of a character according to the width of the dynamic display area and the number of characters to display begins at block 102, where a width W and height H of the dynamic display area is determined or accessed, such as from memory. Additional parameters may be received, including dimensions of a right cushion RC, a left cushion, LC, a top cushion TC, a bottom cushion BC, and a space S, corresponding to areas described above with reference to in FIG. 1. The parameters may be entered by an operator, stored in a memory (such as in a lookup table or other schema), or accessible to the process through any other means. Next, in step 104, the parameter n, representing a number of characters to display, is received. When operating dynamically, the HMI may determine this parameter by reference to the number of significant digits in a numerical value, the number of characters in a word, or more generally by counting the number of characters to be displayed. In block 106, the process sets a character width w according to the width W of the dynamic display area and the number n of characters to display. Ultimately, following such setting of the character width, the characters are displayed, as indicated at step 108. Because the display will typically operate in a dynamic environment in which the displayed characters are periodically subject to change, the process returns from step 108 to step 104, as indicated by reference numeral 110.

In the logic of FIG. 6, step 106 may be further analyzed as a pair of function blocks. In function block 112, the width of the characters is set. If the width W is considered to be the width of a portion of the display available for the characters, the character width w may be set to the width W divided by the number of characters to be displayed n. On the other hand, if W is considered to be the outer dimension of the portion of the display, including cushion spaces, additional parameters may be used, such as a left cushion LC, a right cushion RC, and a character space S, as shown in function block 112. Also, the character height h may be calculated or set from the height H of the dynamic display area, as in function block 114, or from additional parameters such as a top cushion TC and a bottom cushion BC, as shown in function block 114. Again, this setting will essentially depend upon whether the parameter H is taken as the display height available for the characters themselves, or as the overall height of the display portion, including any cushion space for frames, borders, and so forth.

Figure 7:
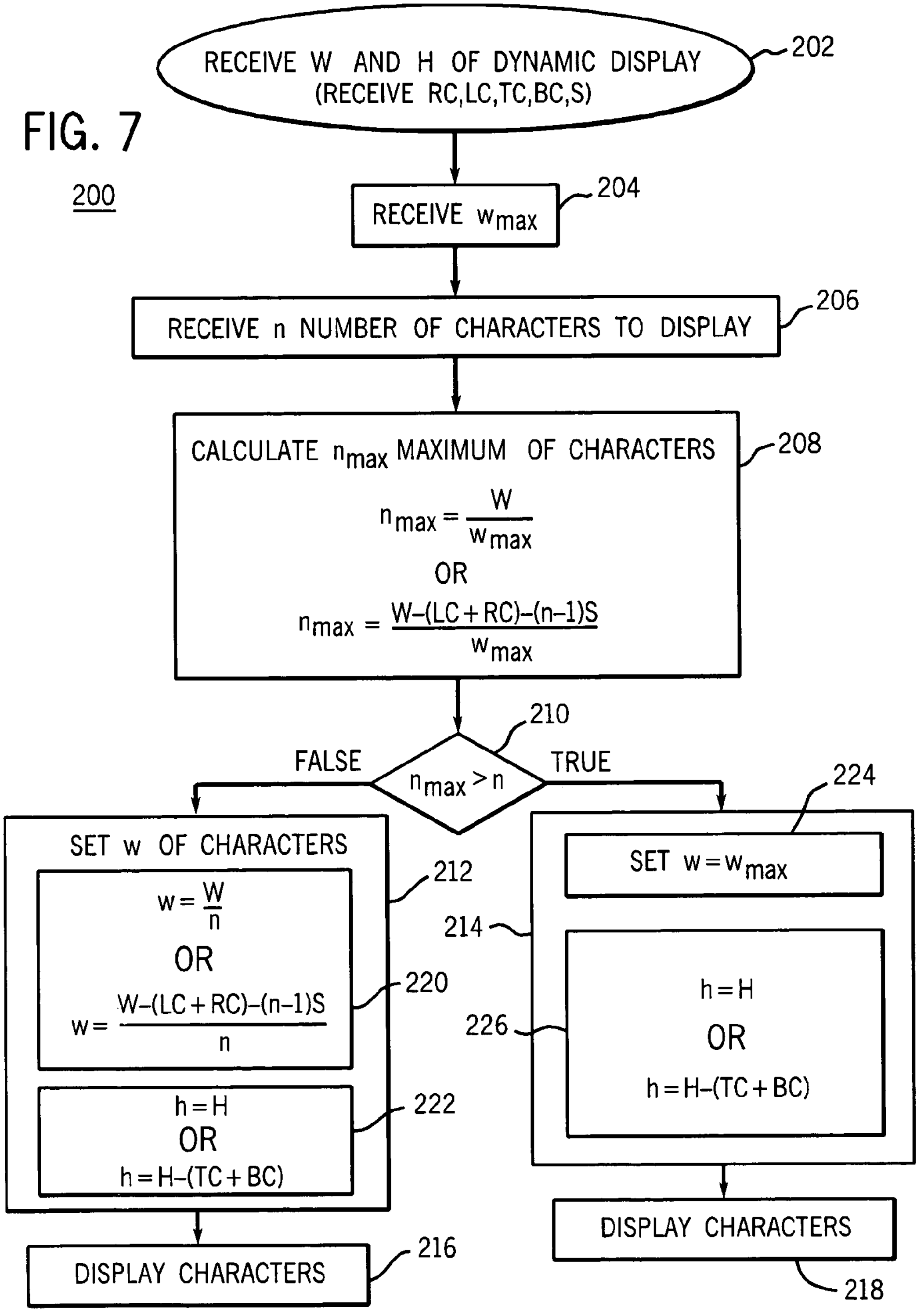
FIG. 7 is a flowchart illustrating a process for using a preferred maximum width when setting the width of the characters according to the invention.

FIG. 7 illustrates a flowchart of an alternative process 200 in which the sizing of the characters uses a preferred maximum character width $w_{max}$. Beginning with block 202, the process receives a width W and height H of the dynamic display area. Additional parameters may be received for spacing, including a right cushion RC, a left cushion, LC, a top cushion TC, a bottom cushion BC, and a space S, corresponding to areas described with reference to FIG. 1. The parameters may, here again, be entered by an operator, stored in a memory, or accessible to the process through any other means. Next, in step 204, the process receives the preferred maximum character width $w_{max}$. The value for $w_{max}$ may also be preset, entered by an operator, stored in a memory, or accessible to the process through any other means. After receiving $w_{max}$, the process enters into the main processing loop beginning with block 206. In block 206, the process receives or determines the number of characters n to display in the dynamic display area. Next, in block 208, the number of characters $n_{max}$ that can be displayed if all are set to the maximum width $w_{max}$ is calculated as a function of the width W of the display and the preferred maximum width $w_{max}$. As summarized with reference to FIG. 6 above, depending upon the parameters received, $n_{max}$ may be calculated based upon the width W of the dynamic display area divided by the preferred maximum width $w_{max}$, or alternatively, $n_{max}$ may be calculated using additional parameters, where the usable display area excludes the left cushion LC, right cushion RC, and space between characters S. Such alternatives essentially depend upon the definition used for the dimension W.

The use of the preferred maximum width $w_{max}$ in sizing the characters is determined in decision block 210, by a comparison between $n_{max}$ and n. If $n_{max}$ is less than n, the process will not be able to set the character width equal to $w_{max}$ (i.e., the characters to be displayed would not fit in the available display area if dimensioned at the maximum width $w_{max}$) and proceeds to block 212, where the character width and height are set. If the maximum number of characters $n_{max}$ is greater than the number of characters to display, then the process moves to block 214. Ultimately, after setting the character width and height, the characters are displayed, as indicated at blocks 216 and 218.

In block 212, one of the alternate paths from decision block 210 chosen because the number of characters to display would exceed the width of the dynamic display area (if their width were set to $w_{max}$), the process sets a character width w according to the width W of the dynamic display area and the number of characters to display n, as in function block 220. Additional parameters may be used, such as a left cushion LC, a right cushion RC, and a character space S, as indicated in function block 220, again depending upon whether the display width W is considered as that available for characters or as the outer dimension of the display area. The height h may be calculated from the height H of the dynamic display area, as in function block 222, or from additional parameters such as a top cushion TC and a bottom cushion BC. Again, after setting the width and height, or, alternatively, setting an aspect ratio, the final step of the process in block 216 is to display the characters in the dynamic display area.

In block 224, as part of the dimension setting block 214, if the characters to be displayed will all fit within the available area at their maximum width $w_{max}$, the width w of the characters to be displayed is set to the preferred maximum width $w_{max}$. The height h of the characters to be displayed is calculated from the height H of the dynamic display area, as in function block 226, or from additional parameters such as a top cushion TC and a bottom cushion BC. Again, after setting the width w and height h, or, equivalently, setting an aspect ratio, the final step of the process in block 218 is to display the characters in the dynamic display area.

Alternatively, the width and height of a character, or the aspect ratio, for a given set of parameters may be precalculated and stored in a lookup table, with the calculations being made generally according to the logic summarized above. When operating dynamically, then, the system can simply determine the number of characters to be displayed at any time, and retrieve the dimensions h and w from the lookup table.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for dynamically displaying numeric values, comprising:

accessing settings for a width and a height of a dynamically configurable display area of a human machine interface (HMI) device;

receiving a plurality of characters for display in the display area of the HMI device, wherein the height of the characters is fixed;

setting the width of the characters based upon the number of characters received and the width of the dynamically configurable display area.

2. A method for dynamically displaying numeric values, comprising:

accessing settings for a width and a height of a dynamically configurable display area of a human machine interface (HMI) device;

receiving a plurality of characters for display in the display area of the HMI device;

setting the width of the characters based upon the number of characters received and the width of the dynamically configurable display area, wherein setting the width of the characters includes subtracting an intercharacter spacing from the width of the dynamically configurable display area, and dividing the resulting value by the number of characters received.

3. A method for displaying numeric values, comprising:

accessing settings for a width and a height of a dynamically configurable display area of a human machine interface (HMI) device;

receiving a first number of characters for display in the dynamically configurable display area of the HMI device;

dynamically determining a first width for each of the first number of characters based upon the width of the dynamically configurable display area and first number of characters;

displaying the first number of characters with the first width in the dynamically configurable display area of the HMI device;

receiving a second number of characters for display in the dynamically configurable display area of the HMI device;

dynamically determining a second width for each of the second number of characters based upon the width of the dynamically configurable display area and second number of characters, wherein the steps of determining the first and second widths include subtracting an intercharacter spacing from the width of the dynamically configurable display area, and dividing the resulting value by the number of characters to be displayed; and displaying the second number of characters with the second width in the dynamically configurable display area of the HMI device, wherein the height of the first and second characters is the same.

4. A method for displaying numeric values, comprising:

setting a width and a height of a dynamically configurable display area of a human machine interface (HMI) device; and dynamically setting an aspect ratio for at least one character to be displayed based upon preset width and height values for the dynamically configurable display area of the HMI device, wherein the aspect ratio is defined by a character width divided by a character height, and the character height is fixed and the character width is a function of the number of characters to be displayed.

5. The method of claim 4, wherein the aspect ratio is dynamically set upon receipt of a number of characters to be displayed.

6. The method of claim 5, comprising receiving a first number of characters for display and setting a width for the first number of characters, and receiving a second number of characters for display and setting a second width for the second number of characters, the height of the first number of characters being equal to the height of the second number of characters.

7. The method of claim 5, comprising setting the maximum width of the characters, the maximum value and the height of the dynamically configurable display area defining a maximum aspect ratio.

8. The method of claim 4, comprising allowing for a cushion area around the characters when setting the aspect ratio.

* * * * *